| United States Patent [19] | [11] | 4,108,244 |
| Cook et al. | [45] | Aug. 22, 1978 |

[54] NATURAL GAS RECOVERY METHOD

[75] Inventors: Charles F. Cook; George E. Hays, both of Bartlesville, Okla.

[73] Assignee: Phillips Petroleum Company, Bartlesville, Okla.

[21] Appl. No.: 803,100

[22] Filed: Jun. 3, 1977

[51] Int. Cl.² ............................................. E21B 43/20
[52] U.S. Cl. .................................... 166/268; 166/266
[58] Field of Search .............................. 166/273–275, 166/252, 305 R, 306, 268, 269; 55/37, 48, 68, 46

[56] References Cited

U.S. PATENT DOCUMENTS

| 2,623,596 | 12/1952 | Whorton et al. ..................... 166/274 |
| 3,097,917 | 7/1963 | Dotts, Jr. et al. ..................... 55/68 X |
| 3,215,198 | 11/1965 | Willman ............................. 166/274 X |
| 3,476,185 | 11/1969 | Cornelius ............................. 166/274 |
| 3,690,040 | 9/1972 | Halfon ..................................... 55/46 |

OTHER PUBLICATIONS

Uren, Petroleum Production Engineering, Oil Field Exploitation, 3rd edition, McGraw-Hill Book Co., Inc., New York, 1953, p. 14.

*Primary Examiner*—Stephen J. Novosad

[57] ABSTRACT

Natural gas enriched in methane is produced from underground natural gas reservoirs of high $CO_2$ content by water flooding to absorb the $CO_2$ within the formation.

7 Claims, No Drawings

NATURAL GAS RECOVERY METHOD

This invention relates to an improved method or process for recovering natural gas from a subterranean natural gas reservoir. In accordance with another aspect, this invention relates to a method for water flooding subterranean natural gas reservoirs of high $CO_2$ content to absorb at least a part of the $CO_2$ within the formation. In accordance with a further aspect, this invention relates to a method for reducing the $CO_2$ content of a natural gas reservoir of high $CO_2$ content to produce a hydrocarbon gas having a sufficient BTU content for use as fuel. In accordance with another aspect, this invention relates to a method for separating $CO_2$ and a hydrocarbon gas from a mixture thereof in a subterranean natural gas reservoir by water flooding to absorb at least a part of the $CO_2$ within the formation.

Subterranean natural gas reservoirs of high $CO_2$ content are known, but the recovery of the natural gas with minimum $CO_2$ is a problem that has not been resolved in a satisfactory manner. There are natural gas reservoirs known which have $CO_2$ contents as high as 70 percent and higher with the remainder being primarily methane and other gases. Because of the vast quantity of $CO_2$ involved in such reservoirs, the ecological and economical problems associated with its on-site removal and disposition are tremendous. Heretofore, the $CO_2$ content of natural gas has not exceeded 20 percent, and the $CO_2$ could be economically absorbed with conventional absorbents. However, for the recovery of natural gas such as methane from reservoirs having higher concentrations of $CO_2$, the cost and magnitude of the necessary equipment and chemicals to remove the large amount of $CO_2$ renders the normal process economically prohibitive. Accordingly, it has become more desirable to devise a more practicable and economical method for removal of $CO_2$ in such large quantities. The present invention relates to an economically feasible method of recovering enriched methane from $CO_2$-rich natural gas reservoirs.

Accordingly, an object of this invention is to provide an improved method of recovering enriched methane from $CO_2$-rich natural gas reservoirs.

Another object of this invention is to provide a process for absorbing $CO_2$ within underground natural gas reservoirs having high $CO_2$ content.

Another object of this invention is to provide a method for separating hydrocarbon gas from a mixture of hydrocarbon gas and carbon dioxide to produce a stream of natural gas enriched in methane.

Still another object of this invention is to provide a method for treating an underground $CO_2$-rich natural gas reservoir to recover enriched methane.

Other objects, aspects, and the several advantages of the invention will be apparent to those skilled in the art upon a study of this disclosure and the appended claims.

In accordance with the invention, natural gas enriched in methane is produced in a subterranean natural gas reservoir of high $CO_2$ content by water flooding the reservoir to absorb $CO_2$ within the formation.

In accordance with one embodiment of the invention, water, preferably sea water, is injected into a $CO_2$-rich natural gas reservoir in a sufficient amount to flood the reservoir and absorb at least a part of the $CO_2$ within the reservoir and recover natural gas enriched in methane via a production well.

In the operation of this invention, at least one remotely located producing well extends from the surface of the earth into a subterranean natural gas reservoir of high $CO_2$ content that is desired to produced. It should be understood that this invention can be practiced where a plurality of producing and injection wells are utilized to flood a common natural gas reservoir. The relative placements of the producing wells are remote from the injection wells and can be in varying patterns such as 5-spot, 7-spot, etc., as known in the art. Flood water is injected downwardly through the injection wells and through the natural gas reservoir in a sufficient amount to absorb $CO_2$ within the formation, forcing the natural gas enriched in methane into the producing wells where they are produced to the surface and recovered.

The volume of flood water to be injected and the mode of injection are generally selected after a study of the properties of the natural gas reservoir. Hydrocarbon sample analysis and formation core analysis produce valuable data for selecting the volumes of flood water to be injected into the particular formation. The amount of water is sufficient to absorb $CO_2$ within the formation so that the natural gas present can be produced with a low $CO_2$ content. Although fresh water can be used, it is preferred to employ sea water, especially on off-shore wells. Generally, the amount of flood water injected into a reservoir will be in the range of 500 to 80,000 pounds per 1,000 cubic feet of relatively $CO_2$-free produced gas measured at standard conditions of temperature and pressure (STP). The amount of water required for a specific gas reservoir is dependent, of course, on the pressure in the reservoir; increased pressure causes an increase in the solubility of the $CO_2$ in the water as does a decrease in reservoir temperature. Water required also depends on the $CO_2$ content of the gas in the reservoir and the amount of $CO_2$ remaining in the produced gas. One skilled in the art can easily calculate the approximate amount of water required for a specific reservoir from available tables of data for $CO_2$ solubility in water.

In a typical illustration of the invention, an off-shore gas reservoir has a pressure of 5,000 psig (34.5 MPa) and a temperature of 180° F (82° C.). The gas in the reservoir contains 75 volume percent $CO_2$ and 25 volume percent methane plus minor amounts of heavier hydrocarbons. Using the 5-spot pattern for the injection and production wells, sea water is pumped into the injection wells at the rate of 33,000,000 lbs./day per injection well or 3,000 gpm. From the four production wells surrounding each injection well is produced 20,000,000 SCF/day of methane containing approximately 5 volume percent $CO_2$.

In some instances, it may be desirable to recover the $CO_2$-laden water from the reservoir through the injection well or one of the production wells. The $CO_2$ is separated from the water and the water recycled via an injection well. Such a cyclic system of water injection and withdrawal may be desirable in certain reservoirs of limited water capacity.

In other instances, the water can be continuously injected at the top of the reservoir and allowed to migrate downwardly to the bottom of the reservoir.

We claim:

1. In the recovery of hydrocarbon gases enriched with methane from underground natural gas reservoirs having high values of $CO_2/CH_4$ ratio, the step of injecting at least 500 pounds water per 1,000 cubic feet of relatively $CO_2$-free methane recovered into said reservoir to flood the reservoir and solubilize $CO_2$ present in the reservoir in the flood water to produce from said reservoir an enriched gas having a higher $CH_4/CO_2$ ratio than originally present in said reservoir.

2. A process according to claim 1 wherein said flood water is sea water.

3. A process according to claim 1 wherein the amount of flood water introduced into the reservoir is in the range of 500 to 80,000 pounds per 1,000 cubic feet of relatively $CO_2$-free methane recovered.

4. A process for producing hydrocarbon gases from a subterranean natural gas reservoir of high $CO_2$ content comprising injecting at least 500 pounds of an aqueous liquid per 1,000 cubic feet of relatively $CO_2$-free methane recovered into said reservoir into an injection well so as to absorb $CO_2$ at the reservoir and produce natural gas enriched in methane through a producing well in said reservoir.

5. A process according to claim 4 wherein said flood water is sea water.

6. A method of recovering hydrocarbon gases from a subterranean hydrocarbon gas-containing formation of high $CO_2$ content penetrated by at least one injection well and at least one production well comprising:

injecting downwardly through an injection well and into the formation at least 500 pounds of flood water per 1,000 cubic feet of relatively $CO_2$-free methane recovered to absorb $CO_2$ within the formation and producing to the surface hydrocarbon gases enriched in methane entering the producing well in the hydrocarbon-containing formation.

7. A method according to claim 6 wherein said flood water is sea water.

* * * * *